April 27, 1926.
M. A. BROADBERE ET AL
1,582,377
INTERNAL COMBUSTION ENGINE
Filed Oct. 2, 1923     3 Sheets-Sheet 2
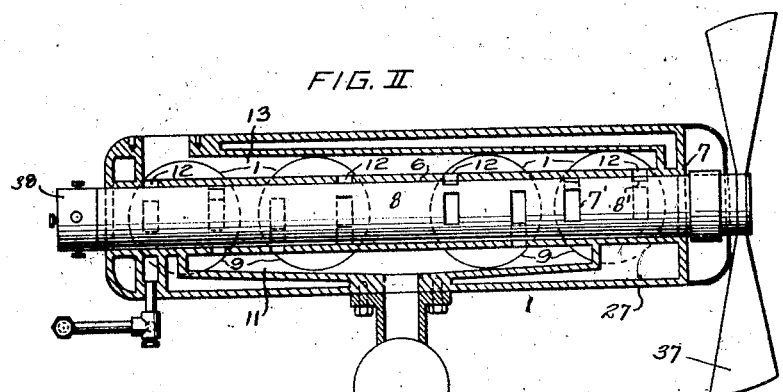
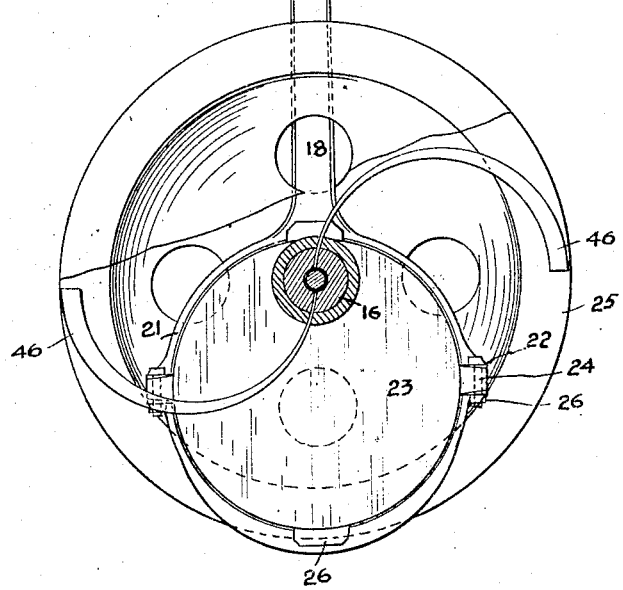
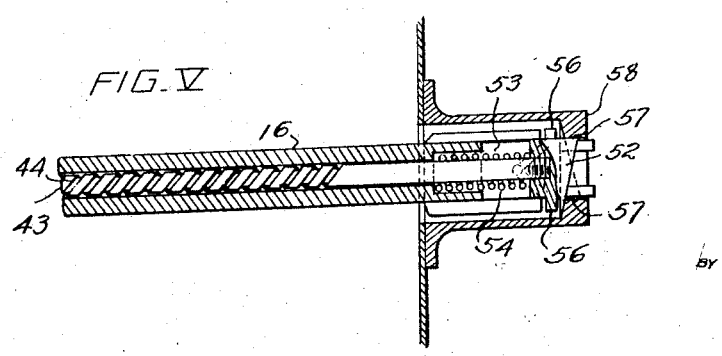
INVENTORS
M. A. BROADBERE
J. W. COSTELLO
ATT'YS April 27, 1926.
M. A. BROADBERE ET AL
1,582,377
INTERNAL COMBUSTION ENGINE
Filed Oct. 2, 1923     3 Sheets-Sheet 3
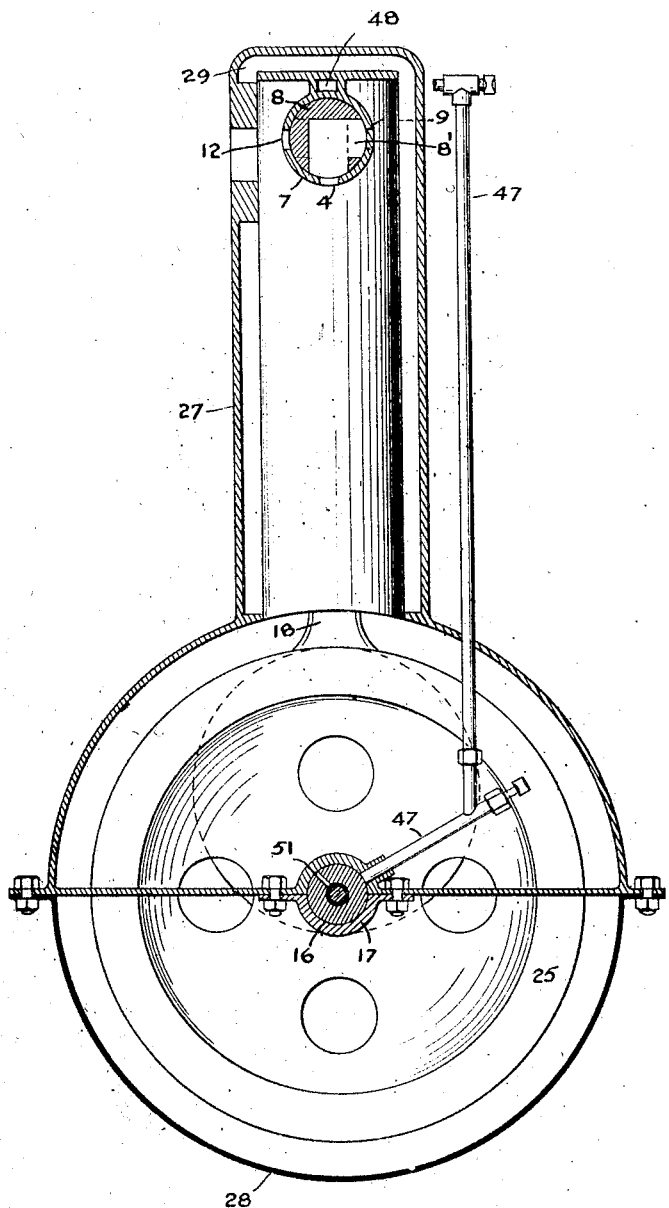
FIG. III
INVENTORS
M. A. BROADBERE
J. W. COSTELLO
BY
ATT'YS Patented Apr. 27, 1926.

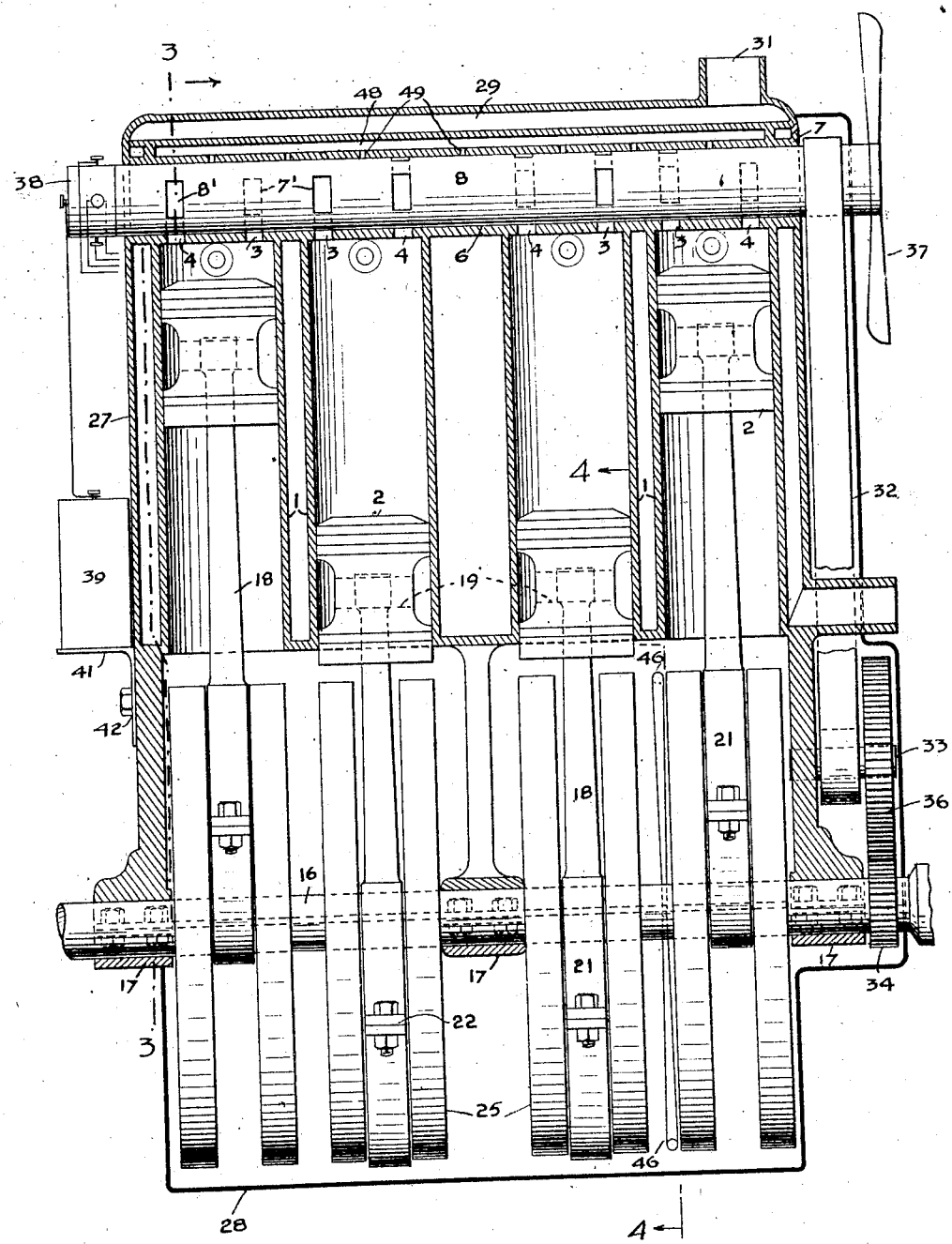

1,582,377

UNITED STATES PATENT OFFICE.

MARTIN A. BROADBERE AND JOHN W. COSTELLO, OF CRESCENT CITY, CALIFORNIA, ASSIGNORS, BY DIRECT AND MESNE ASSIGNMENTS, OF ONE-FOURTH TO F. H. MATTHEW, OF SACRAMENTO, CALIFORNIA, AND ONE-FOURTH TO JENNIE V. MATTHEW, OF VENICE, CALIFORNIA.

INTERNAL-COMBUSTION ENGINE.

Application filed October 2, 1923. Serial No. 666,168.

*To all whom it may concern:*

Be it known that we, MARTIN A. BROADBERE and JOHN W. COSTELLO, citizens of the United States, and residents of Crescent City, county of Del Norte, and State of California, have invented a new and useful Internal-Combustion Engine, of which the following is a specification.

The present invention relates to improvements in internal combustion engines and has particular reference to the power plant of a motor vehicle. The particular object of the invention is to arrange the power plant of a motor vehicle in a more compact manner than has been done before. It is particularly proposed for this purpose to eliminate the tappet valve now commonly used and the cam shaft operating the same and to substitute therefor a rotary overhead valve whereby a large number of parts are eliminated. It is further proposed to provide means for transmitting rotary motion from a reciprocating piston to a straight drive shaft allowing of the elimination of the cranks now commonly employed. It is further proposed to simplify and improve the arrangement of the timer by placing the same directly on the rotary valve whereby the operation of the timer is automatically made to coincide with the operation of the valve, and whereby furthermore the timer is lifted to a higher place on the power plant than is now ordinarily provided which insures freedom of oil and grease. It is further proposed to provide in connection with this arrangement a simple oil circulating system, allowing oil to be picked up from the bottom of the crank case and to be conveyed through the drive shaft and suitably placed piping to the rotary valve from where it is returned to the crank case passing, during its travel, through various bearings of the power plant for lubricating the same. It is further proposed to provide balancing means for the straight drive shaft, insuring perfect and smooth running. Further objects and advantages of our device will appear as the specification proceeds.

The preferred form of our invention is illustrated in the accompanying drawings in which Figure I shows a vertical longitudinal section through our power plant; Figure II, a horizontal section through the rotary valve; Figure III a vertical transverse section taken along line 3—3 of Figure I; Figure IV a transverse vertical section taken along line 4—4 of Figure I, and Figure V, a detail view illustrating our oil circulating system. While we have shown only the preferred form of our device, we wish to have it understood that various changes or modifications may be made within the scope of the claims hereto attached without departing from the spirit of the invention.

Our power plant is shown in the drawings as comprising four cylinders (1) having pistons (2) reciprocating therein. In the top end of each cylinder are provided an intake port (3) and an exhaust port (4), communicating with a cylindrical bore (6), extending longitudinally through the engine head (7). A cylindrical valve (8) is arranged to rotate in the bore and is provided with passages (7) and (8) for each cylinder, which latter passages are arranged to establish communication between the intake ports (3) and ports (9) in the valve housing leading to the intake manifold (11) and between the exhaust ports (4) and ports (12) in the valve housing leading into the exhaust manifold (13). As viewed from the valve housing, the intake and exhaust ports (3) and (4), are disposed in the bottom thereof while the ports leading to the intake and exhaust manifolds respectively, are arranged in the sides of the same. The passages in the valve establishing communication between the different ports at operative times form a right angle within the valve, as shown in Figure (III).

The drive shaft (16) is mounted underneath the cylinders with freedom of rotary motion in the bearings (17). Rotary motion is transmitted from the reciprocating pistons to the drive shaft by means of the connecting rods (18), pivoted to the wrist pins (19) within the pistons and terminating at their free ends in rings (21) split, as shown at (22), for the purpose of facilitating the assembling of the same. These rings are adapted to engage eccentrics (23) formed integral with the shaft (16) for transmission of rotary motion. The rings are constructed of slightly larger diameter than the eccentric so as to leave a clearance between the same, as shown in Figure 4, the actual engagement taking place between the eccentric and wedge blocks (24) embedded in the ring and projecting beyond its inner face. As shown in the drawing, two of the wedge blocks are conical in shape and are clamped between the two halves of the ring by means of bolts (26), so that their position may be easily adjusted and any wear taken up by forcing the wedges inwardly. The two other wedges are embedded in the metal and may be renewed when worn. The engaging faces of the wedges should be dimensioned to substantially equal the bearing surface of the shaft, so that the frictional engagement between the ring and the eccentric extends over an area substantially equal to that of the ordinary connecting rod engaging a crank pin. Two balancing wheels (25) are provided on each side of the eccentric to serve as fly wheels.

The whole engine is enclosed by a suitable housing (27), including the crank case (28) and a water jacket (29) surrounding the vital portions of the engine, communication with the radiator not shown in the drawing through the passages (31).

The valve (8) being disposed in the upper part of the engine receives rotary motion from the drive shaft through the endless belt (32) engaging that portion of the valve extending beyond the valve housing and a small jack shaft (33) which later is rotated from the drive shaft through the pinion (34) and the gear wheel (36). The valve stem system is also used to operate the fan (37) and the timer (38) which latter is mounted on a rearward extension of the valve while the coil (39) is mounted on a bracket (41) secured to the rear end of the engine housing as shown at (42).

Particular attention is called to the oil circulating system which is very much simplified by the introduction of the straight drive shaft. The latter is cored and made to revolve on an inner shaft (43) provided with a spiral groove (44). Two dippers (46) preferably formed as shown in Figure IV, extend from the shaft and are adapted to pick up oil from the bottom of the crank case when the shaft revolves and to deliver the same into the spiral groove (44). The oil then advances through the spiral groove due to the rotary motion of the cored shaft and rises in the tube (47), which latter communicates with a duct (48), disposed on top of the valve housing. From this duct the oil leaks into the valve housing through ports (49) and an unused portion of the same passes on to the front end of the duct (48) and drops on the bearings disposed in the front portion of the engine whereupon it returns to the bottom of the crank case. While traveling through the spiral groove, part of the oil enters the shaft supporting bearings (17) through radial ports (51) in the drive shaft.

The manner of holding the grooved inner shaft against rotation is illustrated in Figure V, from which it appears that the latter shaft terminates at its front end in a forked member (52) of larger diameter adapted to slidably engage with an enlarged recess (53) in the front end of the drive shaft. A strong spring (54), normally forces the member (52) forward and causes the two projections (56), extending radially from the said member to engage with notches (57) in a stationary cap (58) whereby the groove shaft is prevented from rotation. If it is desired to crank the drive shaft by means of a crank handle the latter, which is not shown in the drawing, is made to engage with the member (52) and pressed rearwardly which causes the member (52) to move backward over the resistance of the spring (54) and allows the prongs (56) to engage with registering slots in the drive shaft so that when the crank is rotated, the drive shaft follows its motion.

We claim:

1. In an internal combustion engine, a cylinder having a piston reciprocating therein, a straight drive shaft, an operative connection between the piston and the shaft for transmitting rotary motion to the latter, an overhead rotary valve for the engine and means for lubricating the valve comprising an oil receptacle under the drive shaft, a dipper rotating with the shaft feeding the oil into an internal portion of the shaft and means for conveying the oil to the valve.

2. In an internal combustion engine, a cylinder having a piston reciprocating therein, a straight drive shaft, an operative connection between the piston and the shaft for transmitting rotary motion to the latter, an overhead rotary valve for the engine and means for lubricating the valve comprising an oil receptacle under the drive shaft, a dipper rotating with the shaft feeding the oil into an internal portion of the shaft and a spirally threaded stationary shaft within the rotary shaft forcing the oil toward the overhead valve.

3. In an internal combustion engine, a cylinder having a piston reciprocating therein, a straight drive shaft, an operative connection between the piston and the shaft for transmitting rotary motion to the latter, an overhead rotary valve for the engine, means for transmitting rotary motion from the drive shaft to the valve and a lubricating system comprising an oil receptacle under the drive shaft, a dipper rotating with the shaft feeding the oil into an internal portion of the shaft, a spirally threaded stationary shaft within the rotary shaft for causing the oil to travel and guide means for the oil leading past and communicating with the rotary valve and the transmitting means and returning the oil to the receptacle.

MARTIN A. BROADBERE.
JOHN W. COSTELLO.